April 10, 1945. E. R. HENNINGSEN 2,373,473
LOCK NUT
Filed Feb. 15, 1944
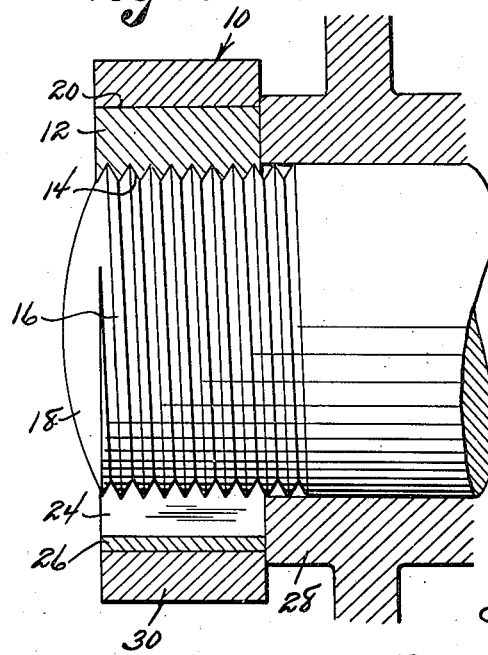
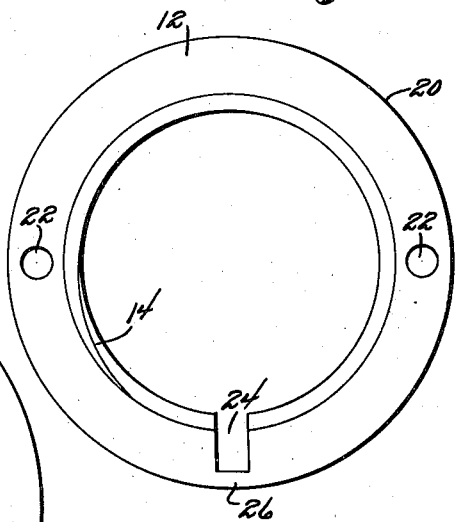
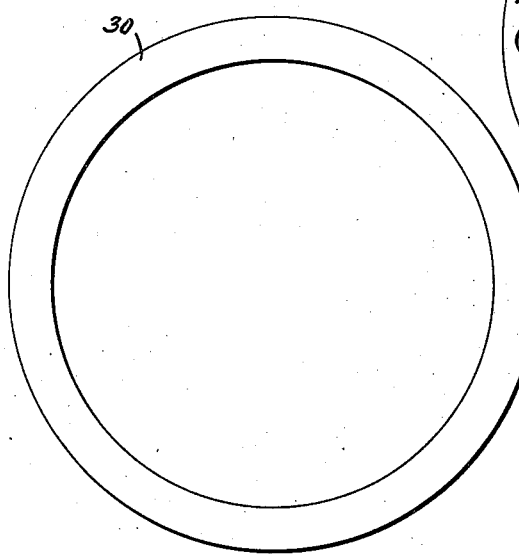
Edgar R. Henningsen
INVENTOR.
BY
Victor J. Evans & Co.
ATTORNEYS Patented Apr. 10, 1945

2,373,473

UNITED STATES PATENT OFFICE 2,373,473

LOCK NUT

Edgar R. Henningsen, Hanna, Wyo.

Application February 15, 1944, Serial No. 522,474

2 Claims. (Cl. 151—14)

My invention relates to lock nuts, and has among its objects and advantages the provision of a novel means for and method of contracting the nut upon its bolt or shaft to secure the parts against relative rotation.

In the accompanying drawing:

Figure 1 is an axial sectional view of the lock nut.

Figure 2 is an end view of one part of the nut, and

Figure 3 is an end view of a second nut part for contracting the part of Figure 2 upon the bolt or shaft.

In the embodiment of the invention selected for illustration, the lock nut 10 of Figure 1 comprises a constrictive nut or ring 12 provided with conventional internal threads 14 formed to a close tolerance with respect to the threads 16 on the bolt 18. This ring has an annular outer face 20 and is provided with bores 22 in one end face for coaction with a spanner wrench. The threaded face of the ring 12 is cut to provide an axial groove 24 extending through both end faces of the ring, but of such depth as to leave a web 26 of sufficient strength to prevent rupturing of the ring as it is threaded tightly against the structural member or other means 28.

While the web 26 prevents the ring from being broken when it is threaded home, the groove 24 weakens the ring 12 to such an extent that it may be compressed or constricted upon the bolt 18 to bring all surfaces of the threads 14 and 16 into contact one with the other. Means for constricting the ring 12 comprises a constrictor or pressure ring 30 having a normal inside diameter less than the outside diameter of the ring 12. The ring 12 is first threaded home on the bolt 18, after which the ring 30 is heated, preferably red-hot, to expand the ring 30 so that it may be placed on the ring 12.

Cooling of the ring 30 causes it to shrink or constrict upon the ring 12. The shrunk ring 30 applies an enormous pressure on the ring 12, which causes the web 26 to yield and reduce the diameter of the ring 12 and cause all surfaces of its threads to have such frictional engagement with all corresponding surfaces of the threads 16 as to positively lock the ring to the bolt. The lock nut 10 may be removed by cutting through the ring 30 and then opening the ring 12 by cutting the web 26.

Notwithstanding the fact that it is necessary to destroy the lock nut 10 before it can be removed from the bolt, the bolt threads remain unimpaired so that the bolt may be reused.

Without further elaboration, the foregoing will so fully explain my invention, that others may, by applying current knowledge, readily adapt the same for use under various conditions of service.

I claim:

1. A lock nut comprising an interally threaded and endless nut ring having an internal axial slot extending from end to end and of a depth less than the thickness of the walls of the ring to provide a compressible web portion, and a pressure ring having an inside diameter normally less than the outside diameter of the nut ring and adapted to be expanded by heat to be insertable over the nut ring when in such heated condition to shrink upon the nut ring when cooled to compress said compressible portion and constrict the nut ring.

2. A lock nut comprising an internally threaded and endless nut ring having a slot weakening a portion of the wall of the nut ring to form a compressible portion, and an endless pressure ring having an inside diameter less than the outside diameter of the nut ring at normal temperature but insertable over the nut ring when heated to shrink upon the nut ring upon returning to normal temperature and compress said portion to constrict the nut ring.

EDGAR R. HENNINGSEN.